United States Patent Office 2,795,024
Patented June 11, 1957

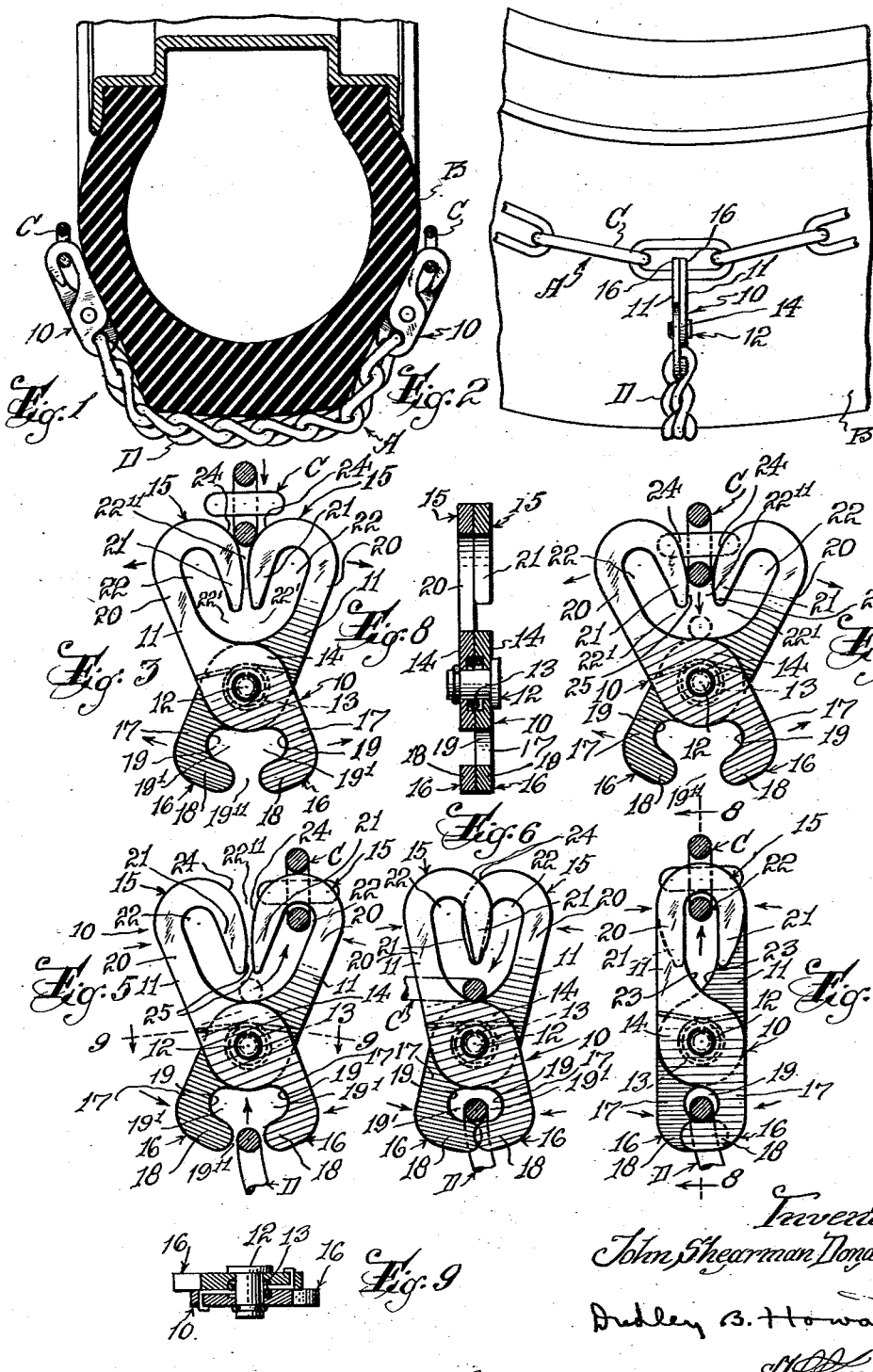

2,795,024

COUPLING DEVICE

John Shearman Donaldson, Chatham, N. J.

Application November 25, 1953, Serial No. 394,279

2 Claims. (Cl. 24—73)

The invention relates to coupling devices for detachably connecting the links of separate chains or any other links or ring-like structures.

More specifically, the present invention is intended to improve upon the coupling device disclosed in my Patent Number 2,128,804, dated August 30, 1938, which was purposely devised for use in connection with anti-skid chains for automobile tires. Although a coupling device of this kind is capable of general application, it is my primary purpose to fill the need for a more dependable and more easily operable coupling device to aid motorists and service station attendants in repairing broken anti-skid chains under the adverse weather conditions which always attend such operations, it being the presence of mud, snow and ice that calls for the use of chains.

Before pointing out the specific advantages of the improved coupling device over my earlier device, the heretofore well established maintenance facilities and procedures will be explained. Since the cross-chain elements of anti-skid chains come into direct frictional contact with the ground and thus are the elements which become worn out and broken, it has been the practice of manufacturers of these driving accessories to provide each end of each cross-chain element with a tool-detachable connector hook-link of comparatively bendable metal for connection to a conveniently located link of the adjacent side-chain element. This originally provided connector link has a pliable hook at its free end for tightly crimped engagement with the selected side-chain link. For the convenience of service stations, they have been supplied with special tools for opening and closing these end hooks whenever they are called upon by a motorist to replace a cross-chain element that has failed, and they also have been supplied with spare cross-chain elements having pliable hooks at both ends in open condition. The particular disadvantage of these maintenance arrangements is that the defective anti-skid chains must be completely removed from the tires to permit use of the special tools that have been provided. Moreover, the service station attendant frequently has difficulty in extracting a single cross-chain from the box of spares, because the open end hooks become entangled with the links of other chains, and, to add to this annoyance, the attendant's fingers are stiff from handling cold, icy chains, jacks, and other equipment. Obviously, a repair job of this kind is disagreeable, tedious, time-consuming and unduly expensive. That is why I devised my earlier quickly attachable coupling device, which permitted service station men to replace a broken cross-chain without having to remove the anti-skid chain from the tire after my coupling device had been installed. Two of my coupling devices were then used to couple the ends of a cross-chain (minus any end hooks) to the side-chains.

However, my earlier coupling device was found to possess certain commercial disadvantages. It consisted of a pair of double-hook members of different shapes and a third, single-hook member, all being pivotally united. When replacing a defective cross-chain with my earlier coupling device which replaced the pliable end hook, it was necessary to engage the hooks at one end of the device with the end link of the spare cross-chain first and then draw the side-chain forcibly in the direction of the cross-chain in order to engage a selected link of the former with the hooks at the opposite end of the coupling device. When the fingers are stiffened by the cold and the side-chain and coupling device are slippery, it is very difficult to perform the required in-drawing and hook-engaging operation. Sometimes, the coupling device slips out of the fingers, becomes detached from the cross-chain and falls into the snow. Also, in order to uncouple one end, both ends had to become uncoupled, which condition made it more difficult to operate. Another disadvantage of my earlier coupling device was its tendency to become disengaged from the side-chain link under the influence of road vibration, because the single-hook member that was intended to close the mouths of the outer pair of hooks of the double-hook members was secured in closed position by detent-and-notch means that could slip out of engagement with excessive vibration.

It therefore is the primary object of the present invention to provide a coupling device of improved construction which is capable of secure initial engagement with links of both the side-chain and the cross-chain before the still necessary in-drawing of the two chains is performed to effect final adjustment of the coupling device. Consequently, the coupling device cannot become accidentally detached during this final step in the operation even if the finger grip becomes momentarily lost. The coupling device will still be hanging in partially coupled relation to both chains.

Another object of the invention is to provide the coupling device with cooperative means for resisting accidental disengagement under bad driving conditions, which includes improved structure of the hooks that engage the side-chain link and resilient means to yieldingly bias the said hooks toward closed condition.

A further object is to simplify the structure of the coupling device by reducing the number of pivoted hook-bearing members from three to two.

It is an object of the invention also to provide some of the hooks with wedge faces between which the side-chain link may be inserted and forcibly pressed to aid in opening the hooks.

Other objects, advantages and features of the invention will become apparent as the following specific description is read in connection with the accompanying drawing, in which:

Fig. 1 is a fragmentary cross-sectional view of a tire fitted with anti-skid chains and showing the improved coupling device applied thereto; and Fig. 2 is a side elevation of the same.

Fig. 3 is a side elevation of the coupling device on an enlarged scale, showing the same in partially open condition for the first step in engaging a link of the side-chain with the long hooks of the device; Fig. 4 is a similar view, showing the next step; Fig. 5 is a similar view, showing the side-chain link fully engaged and the end link of a cross-chain in the act of being engaged with the short hooks of the coupling device, and also showing in broken lines the position into which the side-chain link may be moved to wedge the hook members open; Fig. 6 is a similar view, showing the cross-chain link fully engaged and the side-chain shifted into position to permit complete closing of the coupling device; and Fig. 7 is a similar view of the coupling device in closed condition, showing in broken lines the position into which the side-chain link may be moved to wedge the hook members open.

Fig. 8 is a longitudinal sectional view of the coupling device; and Fig. 9 is a transverse sectional view of the same.

Referring now in detail to the drawing, wherein like reference characters designate corresponding parts in the several views, the letter A refers to an anti-skid snow chain of conventional design which is applied to an automobile tire B with its side-chain elements C extending circumferentially along the opposite side walls of the tire and its spaced cross-chains D (of which only one appears) extending laterally across the tire tread.

The improved coupling device 10 is intended primarily, like my earlier device, to connect a terminal link of cross-chain D of anti-skid chain A detachably to a suitably positioned link of the adjacent side-chain C. Every structural feature of coupling device 10 has been devised to meet the exacting conditions of that specific use, but, as previously stated, the said device is also well suited to use in other capacities.

Coupling device 10 comprises four component parts, viz: two mated double-hook members 11—11 of substantially S-shape; pivot means, such as pin 12, that unites said members 11—11 at a point located between their ends for relative angular adjustment; and resilient means, such as coil spring 13, that yieldably biases members 11—11 toward the closed condition represented in Fig. 7.

It is preferred to stamp members 11—11 from heavy plate material and then to caseharden the members so that they will be able to withstand the abrasive effect of ground contact. However, before the casehardening treatment, members 11—11 should have their outer edges rounded off to prevent injury to the tire on which the anti-skid chain may be mounted.

Body members 11—11 are substantially identical in form and each of them includes a hub 14 to which pivot pin 12 is applied. Relatively long and short hooks 15 and 16, respectively, project in diametrically opposite directions from the hub 14 of each member 11. Each short hook has a comparatively short shank 17 extending substantially tangential with respect to hub 14 of members 11—11 when assembled on pivot pin 12 and a short arcuate jaw 18 concentric to the hub axis to provide a shallow jaw space 19 for engagement with the end link of a cross-chain D.

The long and short hooks of each member 11 are oppositely arranged, hence the expression "S-shaped" previously applied to each member, and the two mated members are also reversely arranged when assembled so that the mouths 19' of the jaw spaces of the short hooks 16—16 will be inwardly facing and in registration when the said hooks are opened to any degree as shown in Figs. 3 to 6, inclusive. When the short hooks are closed, as shown in Fig. 7, jaws 18—18 will overlap and completely close the radially presented composite mouth 19" of the coacting jaws combination 18—18.

Each long hook 15 has a long straight shank 20 disposed substantially tangential with respect to hubs 14 of both members 11—11 when assembled and a substantially straight re-entrant jaw 21 arranged preferably parallel to shank 20 to provide a parallel-sided jaw space 22 of considerable length. The chosen length of jaw space 22 is such that it will be quite unlikely that a side-chain link engaged in said space will ever reach the mouth of the jaw space under the most severe vibration encountered in road travel, as when the tire is suddenly compressed and restored to normal size beneath the wheel. By making the jaw space only slightly wider than the cross-sectional thickness of the link stock, the engaged link will tend to prevent opening of the hooks. Spring 13 adds its hook-closing bias to the similar action of the link just mentioned.

As in the case of short hooks 16—16, the long hooks 15—15 have their jaw mouths 22'—22' inwardly facing and in lateral registration when the hooks are open to any degree as shown in Figs. 3 to 6, in which conditions the radially presented composite mouth 22" of the coacting jaws combination 21—21 will be closed except in the very widely separated condition represented in Fig. 4. In the closed condition of coupling device represented in Fig. 7, the jaws 21 of long hooks 15—15 will overlap shanks 20—20 to completely secure an engaged link of the side-chain against detachment.

The specific length of jaws 21—21 of long hooks 15—15 is so related to the lengths of jaws 18—18 of short hooks 16—16 that, when the composite mouth 19" of the short hooks is opened just barely wide enough to admit the terminal link of a cross-chain D, the composite mouth 22" of the long hooks will be closed. (Fig. 5.) This condition serves an especially useful purpose in the operation of the device to be described presently.

It will be observed in Fig. 7 that the inner edges of shanks 20—20 of long hooks 15—15 merge with hubs 14—14 in inwardly converging wedge faces 23—23. Also, the opposed outer edges of jaws 21—21 are convexly curved to provide outer and inner wedge faces 24—24 and 25—25, respectively. All of these wedge faces aid manual opening of the composite hook mouths in a manner to be described later in connection with the operation of the device.

Referring again to the resilient means for yieldably biasing members 11—11 toward closed condition, it may be stated that spring 13, which encircles pivot pin 12 in interposed countersunk relation to hubs 14—14 of said members with its terminal arms suitably anchored in the latter, should be of such form that it will be in relaxed condition when members 11—11 are in the parallel closed relation shown in Fig. 7. As a result, spring 13 will resist angular motion of members 11—11 in either direction and will maintain the coupling device in closed condition when not in active use. Closing stop abutments (not shown) are optional.

The operation of the coupling device in its primarily intended capacity will now be described. Assuming that the driver of a car whose rear wheels are equipped with anti-skid chains of the type that have soft-metal hooks on the ends of the cross-chain elements in crimped engagement with links of the side-chain element becomes aware that one of the cross-chain elements is broken, his first action will be to stop at a service station for assistance unless he happens to be equipped with a repair kit including wire cutters and some spare hookless cross-chains and coupling devices of the improved model. Regardless of who does the repair job, the first step is to remove the broken pieces of cross-chain by cutting off the soft-metal end hooks. The next step is to use one of the coupling devices to couple one end of the replacement cross-chain to one of the side-chains, which preferably will be the one on the inside of the tire so as to leave the more accessible outside chain to be manipulated in the more difficult final operation. In coupling the inner end of the cross-chain to the inner side-chain, coupling device 10 is applied to the said side-chain at the proper location by engaging its long hooks 15—15 with the selected link thereof. This may be done by first adjusting the long hooks by use of the thumb and fingers of one hand into the partially open condition represented in Fig. 3. Then, by use of the other hand, the side-chain link may be pressed against the now exposed wedge faces 24—24 until the composite mouth 22" between the adjacent edges of jaws 22—22 is opened sufficiently for passage of the link inwardly therethrough as shown in Fig. 4. Since this first operation does not require any indrawing of the affected side-chain, the short hooks 16—16 may be engaged with the cross-chain link by insertion of the latter through mouth 19" while the side-chain link is in the position represented in broken lines in Fig. 5. In this instance, relaxation of the grip on coupling device 10 will result in automatic closing of the same by action of spring 13.

It is the subsequent application of a second coupling device to the opposite end link of the cross-chain and a selected link of the outer side-chain that may cause trouble in use of my earlier coupling device, as previously explained. With the improved coupling device, however, there can be no real difficulty. After insertion of the side-chain link through mouth 22" of the long hooks 15—15, the said link is purposely moved through the mouth 22' of one of the long hooks 15 into the position represented in full lines in Fig. 5, and then the jaws 21—21 are caused to assume the closely spaced positions shown wherein the mouth 22" is substantially closed so that the side-chain link cannot become detached from the long hooks. Even if the coupling device accidentally slips out of the fingers that hold it, the said device will be safely suspended by the side-chain until re-grasped. It cannot fall to the ground. Now, with the coupling device in the partially open condition represented in Fig. 5, the unattached end link of the cross-chain is inserted through mouth 19" into the jaw space of the short hooks and the coupling device is permitted to close partially into the condition represented in Fig. 6, in which the cross-chain link is securely engaged by the short hooks and the jaws 21—21 of the long hooks are overlapped in a position to permit movement of the captivated side-chain link into the position shown which will permit complete closing of the coupling device as shown in Fig. 7. Movement of the side-chain link into the position shown in Fig. 6 requires forcible in-drawing of the adjacent portion of the side-chain toward the near end of the cross-chain. As previously stated, it was at this point in use of my earlier coupling device that accidental failure of grip on the device, due to the adverse slippery condition of the coupling device, was almost certain to result in annoying and time-consuming dropping of the device. In use of the improved coupling device, the worst thing that can happen is for the side-chain link to slip back into the position indicated in full lines in Fig. 5. The coupling device will retain its incompletely adjusted engagement with both chains. All that is necessary is to keep on trying until the side-chain link has been drawn into the position shown in Fig. 6 and held therein until the device has been closed completely into the condition depicted in Fig. 7 with the aid of the spring 13.

Still referring to Fig. 7, whenever it becomes necessary to disengage the side-chain and cross-chain links from coupling device 10, opening of the respective long and short hooks 15—15 and 16—16 can be started easily by pressing the engaged portion of the side-chain link inward against wedge faces 23—23 to wedge the long hooks apart. Thereafter, the opening action can be finished readily by reversing the direction of motion of the side-chain link (Fig. 5) to press it against the wedge faces 25—25 and thereby wedge mouth 22" open. Sometimes, the use of these wedging faces becomes quite a convenience.

It is contemplated that a change in maintenance arrangements will occur whereby, in the process of manufacture and assembly, all anti-skid chains of the future will be provided with a full set of the improved coupling devices to couple both ends of all cross-chain elements to the side-chain elements in substitution for the objectionable crimped soft hooks. Incidental to the contemplated change, the spare cross-chains that will be kept in supply by the service stations will have no end hooks to become entangled, so extraction of one from a box will be greatly facilitated.

It will be understood that it is intended to cover all changes and modifications of the example of the invention herein chosen for the purpose of illustration which do not constitute departures from the spirit and scope of the invention.

Having thus described the invention, I claim:

1. A coupling device comprising a pair of mated double-hook members of substantially S-shape, each of said members including a hub and co-planar relatively long and short hooks projecting in opposite directions from said hub, both of said members being arranged in parallel planes and pivotally united at their hubs for overlapping angular adjustment about the pivotal axis with the respective long and short hooks adjacently disposed and having their jaw mouths inwardly facing toward each other, each short hook having a short shank substantially tangential with respect to the hub of the corresponding hook member and a short arcuate jaw substantially concentric to the hub axis to provide a shallow link-engaging jaw space of semi-circular outline, each long hook having a long shank substantially tangential with respect to the hub of the corresponding hook member and a straight re-entrant jaw substantially parallel to said shank to provide a deep elongated jaw space of a width substantially equal to the diameter of the jaw space of the short hook, the length of the jaws of the short hooks being such that only the said jaws overlap in the closed condition of the device whereas the length of the jaws of the long hooks is such that they overlap the shanks of said hooks in closed condition, the width of the jaw spaces of the short and long hooks being substantially the same to accommodate with slight clearance chain links made of stock of equal cross-sectional size, and the construction and relative arrangement of the long and short hooks being such that the jaw points of the long hooks will be closer together than the width of the jaw spaces thereof to bar exit of an engaged link from within the intercommunicating jaw spaces when the coupling device is partially opened sufficiently to separate the jaw points of the short hooks to a distance substantially equal to the diameter of the jaw space of each short hook, whereby a chain link may be admitted between said jaw points while preventing disengagement of the long hooks with a similar chain link.

2. A coupling device as defined in claim 1, wherein resilient means yieldably tends to maintain the double-hook members in closed condition and to resist movement therefrom in either direction.

References Cited in the file of this patent

UNITED STATES PATENTS

| | | |
|---|---|---|
| 294,449 | Day | Mar. 4, 1884 |
| 656,923 | Beard | Aug. 28, 1900 |
| 955,070 | Honabach | Apr. 12, 1910 |
| 2,128,804 | Donaldson | Aug. 30, 1938 |

FOREIGN PATENTS

| | | |
|---|---|---|
| 44,272 | Denmark | June 29, 1931 |